United States Patent [19]

Hübecker et al.

[11] 4,414,247

[45] Nov. 8, 1983

[54] METHOD FOR SURFACE TREATMENT OF THREADING

[75] Inventors: Hans Hübecker; Friedrich Lenze, both of Düsseldorf; Gerhard Missaire, Ruppichteroth, all of Fed. Rep. of Germany

[73] Assignee: Mannesmann Aktiengesellschaft, Düsseldorf, Fed. Rep. of Germany

[21] Appl. No.: 363,297

[22] Filed: Mar. 29, 1982

[30] Foreign Application Priority Data

Jan. 11, 1982 [DE] Fed. Rep. of Germany ..... 81730042

[51] Int. Cl.$^3$ ................... B05D 7/22; B05D 3/12; B05D 3/02
[52] U.S. Cl. .................. 427/230; 427/239; 427/292
[58] Field of Search .............. 427/230, 239, 292

[56] References Cited

U.S. PATENT DOCUMENTS 4,312,900  1/1982  Simpson .................. 427/292 X

Primary Examiner—James R. Hoffman
Attorney, Agent, or Firm—Ralf H. Siegemund

[57] ABSTRACT

The surfaces of threads, sealing surfaces, and other load-bearing surfaces of oil field tubes or the like are treated by blasting surfaces to increase the roughness thereof to obtain a roughness of an average depth of from 7 to 15 micrometers under utilization of corundum or silicon carbide at a grain size of from 40 micrometers to 200 micrometers; a resin varnish is deposited onto the blasted surface for curing at higher than room temperature and including molybdenum sulfide at a layer thickness of from 5 to 20 micrometers. The varnish is cured in situ by heating.

1 Claim, No Drawings

METHOD FOR SURFACE TREATMENT OF THREADING

BACKGROUND OF THE INVENTION

The present invention relates to a method for the surface treatment of load-bearing surfaces in steel casings, oil or gas field tubes, or the like.

Casings and tubing of the type to which the invention pertains are used in the oil and gas industry and are to be provided with a thread or threads so that these casings or tubings can be threadedly interconnected with each other or with sleeves. The load-bearing surface portions of the threading or the entire surface of the threaded portion of such a casing, tube or pipe must be particularly treated in order to counteract excessive wear when the joint is made up. The same is true with regard to specially provide sealing surfaces and shoulders which will enter into metal-to-metal engagement with suitably contoured counterparts in the respective other tube, casing, sleeve, or the like, in order to obtain a sealed connection. These sealing surfaces are also required to be particularly treated because, in any of these cases, it is necessary to provide surface properties which will result in a reduction of the sliding resistance of the respective parts so that, upon threading them together, the sliding resistance is greatly reduced.

It is quite apparent that threaded and sealing connections of the type outlined above experience a very high percent of surface unit area loads. These loads are required simply because, in order to obtain the requisite firm and sealed connection, the engaging surfaces must be very forcefully pressed together. On the other hand, many of these threaded connections have to be released upon unthreading the tubing and sleeves from each other; moreover, these threaded connections, sealing surfaces, etc., have to be reused in the same capacity, possibly over and over again. If the respective high-load-bearing surfaces are not adequately treated, in other words, if they pertain to the type of steel which is normally being used for such casings and tubes, these surfaces will score as they slide against and over each other. Such a steel may be of the low-alloyed variety or of the high-alloyed variety with additions of chromium, nickel, molybdenum, and other additives; here, in particular, one has to expect that in the normalized or dressed condition, these alloy components are subject to scoring, welding, and other mutual damage.

The simplest mode of treating the surfaces of the tubes and casings of the type mentioned above is to deposit high-pressure grease upon the surfaces. In accordance with another proposal, the surface expected to experience a high load is treated chemically, or another metal is deposited or plated on. Also, the so-called phosphating is a method which falls within this class. All of these known methods have been found to be unreliable for one reason or another.

DESCRIPTION OF THE INVENTION

It is an object of the present invention to protect high-load-bearing casings and tubings in the oil and gas field industry against scoring, galling, or the like; to improve particularly the adhesion of a particular sliding lubricating and greasing substance upon the steel of the casing or tubing; and to improve also cohesiveness of the sliding and lubricating material in order to maintain an uninterrupted layer which is resistant to mechanical damage.

In accordance with the preferred embodiment of the present invention, it is suggested to impart upon particular load-bearing surfaces in oil and gas field pipes with a surface roughness having an average depth of seven-to-fifteen micrometers, under utilization of a high-pressure blasting beam which includes grains made of corundum or silicon carbide at a grain size of between forty-to-two-hundred micrometers, which treatment is to be succeeded by depositing a synthetic resin varnish being amenable to curing at higher than room temperature; the resin is to include molybdenum sulfide ($MoS_2$) as a pigmentation; a layer so provided is to have a thickness of from five-to-twenty micrometers on the roughened surface; following this depositing, the layer should be heated in order to obtain curing. The depositing step may be provided either through spraying, dipping, or just painting or just brushing on of that particular material. The resin is preferably Molykote®3402 or Molykote®Q5-7400

®Dow Corning

The invention is not limited to the embodiments described above; but all changes and modifications thereof, not constituting departures from the spirit and scope of the invention, are intended to be included.

We claim:

1. The method of treating load-bearing surfaces of oil field tubes, casings, and the like, comprising the steps of
   blasting the surfaces for increasing the roughness thereof in order to obtain a roughness of an average depth of from 7 micrometers to 15 micrometers, and under utilization of corundum or silicon carbide at a grain size of from 40 micrometers to 200 micrometers;
   depositing a synthetic resin varnish onto the blasted surfaces, the varnish curing at a higher than room temperature and including molybdenum sulfide, the varnish being deposited at a layer thickness of from 5 micrometers to 20 micrometers; and
   curing the deposited varnish by heating.

* * * * *